US011119737B1

(12) United States Patent
Pike et al.

(10) Patent No.: US 11,119,737 B1
(45) Date of Patent: Sep. 14, 2021

(54) DYNAMIC COLUMN GUIDES AND DATA REPRESENTATION ON AN APPLICATION DEVELOPMENT WORKSPACE

(71) Applicant: ADP, LLC, Roseland, NJ (US)

(72) Inventors: Yair Pike, New York, NY (US); Michael Greene, New York, NY (US); Elizabeth Gao, New York, NY (US); Claire Casaregola, New York, NY (US); Lauren Miller, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/989,396

(22) Filed: Aug. 10, 2020

(51) Int. Cl.
*G06F 8/38* (2018.01)
*G06F 8/20* (2018.01)
*G06F 9/451* (2018.01)

(52) U.S. Cl.
CPC ............... *G06F 8/38* (2013.01); *G06F 8/20* (2013.01); *G06F 9/451* (2018.02)

(58) Field of Classification Search
None
See application file for complete search history.

(56) References Cited

U.S. PATENT DOCUMENTS

| 11,005,739 | B2* | 5/2021 | Steen | H04L 43/12 |
|---|---|---|---|---|
| 2016/0077810 | A1* | 3/2016 | Bertilsson | G06F 8/35 |
| | | | | 717/105 |
| 2016/0224536 | A1* | 8/2016 | Thomas | G06F 40/18 |
| 2017/0337251 | A1* | 11/2017 | Kordasiewicz | G06F 21/552 |
| 2018/0032518 | A1* | 2/2018 | Kordasiewicz | G06F 16/156 |
| 2018/0129482 | A1* | 5/2018 | Colle | G06F 8/34 |
| 2019/0065487 | A1* | 2/2019 | Olsson | G06F 40/106 |
| 2020/0097481 | A1* | 3/2020 | Cosentino | G06F 16/248 |
| 2020/0110796 | A1* | 4/2020 | Tsabba | G06F 40/154 |
| 2021/0011957 | A1* | 1/2021 | Lenzner | H04W 12/77 |

* cited by examiner

*Primary Examiner* — Toan H Vu
(74) *Attorney, Agent, or Firm* — Yee & Associates, P.C.

(57) ABSTRACT

Building a user interface of an application under development is provided. A data field is connected to each label user interface component within a respective column user interface component. A name of the data field connected to a respective label user interface component is displayed in a canvas area of an application development workspace. Data of the data field connected to each respective label user interface component are rendered in the canvas area of the application development workspace enabling a user to preview a look of the user interface of the application under development during application design time before implementation. The user interface of the application under development is built in response to receiving an input from the user to build the user interface after previewing the look of the user interface.

20 Claims, 16 Drawing Sheets

1200
APPLICATION DEVELOPMENT WORKSPACE

FROM FIG. 14A

FIG. 14B

1416 — ADD, BY THE COMPUTER, A SET OF ADDITIONAL COLUMN USER INTERFACE COMPONENTS TO THE ROW USER INTERFACE COMPONENT IN RESPONSE TO RECEIVING AN INPUT FROM THE USER ADDING THE SET OF ADDITIONAL COLUMN USER INTERFACE COMPONENTS

1418 — AUTOMATICALLY ADJUST, BY THE COMPUTER, A SIZE OF EACH COLUMN USER INTERFACE COMPONENT ADDED TO THE ROW USER INTERFACE COMPONENT IN ACCORDANCE WITH THE AUTOMATICALLY ADJUSTED OVERALL LENGTH OF THE PREDETERMINED NUMBER OF COLUMN GUIDES TO COMPLETE A LAYOUT OF A USER INTERFACE OF AN APPLICATION UNDER DEVELOPMENT

1420 — ADD, BY THE COMPUTER, A LABEL USER INTERFACE COMPONENT WITHIN EACH COLUMN USER INTERFACE COMPONENT ADDED TO THE ROW USER INTERFACE COMPONENT TO DISPLAY TEXT INSIDE EACH COLUMN USER INTERFACE COMPONENT IN RESPONSE TO RECEIVING AN INPUT FROM THE USER ADDING THE LABEL USER INTERFACE COMPONENT

1422 — CHANGE, BY THE COMPUTER, ATTRIBUTES OF THE LABEL USER INTERFACE COMPONENT WITHIN EACH RESPECTIVE COLUMN USER INTERFACE COMPONENT IN RESPONSE TO RECEIVING AN INPUT FROM THE USER CHANGING THE ATTRIBUTES OF THE LABEL USER INTERFACE COMPONENT IN ORDER FOR THE USER TO VISUALIZE A STYLE APPLIED TO EACH RESPECTIVE LABEL USER INTERFACE COMPONENT IN THE CANVAS AREA OF THE APPLICATION DEVELOPMENT WORKSPACE TO FORM AN EMPTY-DATA STATE

1424 — CONNECT, BY THE COMPUTER, A PARTICULAR DATA SOURCE AND DATA FIELD TO EACH RESPECTIVE LABEL USER INTERFACE COMPONENT WITHIN EACH RESPECTIVE COLUMN USER INTERFACE COMPONENT IN RESPONSE TO RECEIVING AN INPUT FROM THE USER CONNECTING THE PARTICULAR DATA SOURCE AND DATA FIELD TO EACH RESPECTIVE LABEL USER INTERFACE COMPONENT WITHIN EACH RESPECTIVE COLUMN USER INTERFACE COMPONENT

TO FIG. 14C

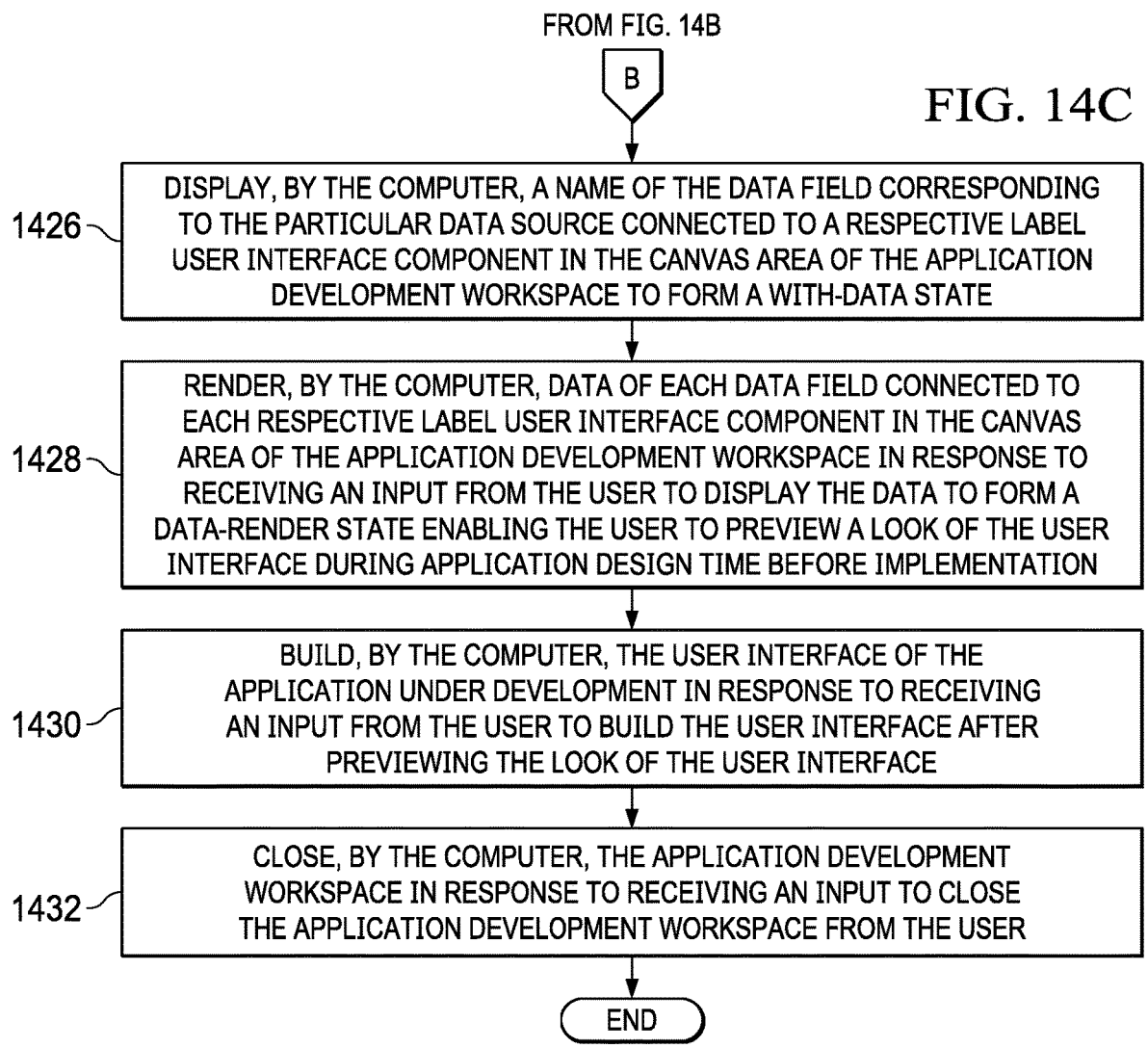

DYNAMIC COLUMN GUIDES AND DATA REPRESENTATION ON AN APPLICATION DEVELOPMENT WORKSPACE

BACKGROUND

1. Field

The disclosure relates generally to application development and more specifically to automatically applying a predetermined number of column guides to an application development workspace canvas to provide guidance to users while building user interface components of an application under development and rendering data of connected data sources in corresponding user interface components during design time of the application enabling users to see which data source is connected to each respective user interface component in real time.

2. Description of the Related Art

An application is software that can be run on a computer or similar device, such as a smart phone or tablet, to accomplish a task. Applications may include for example, human resource applications, banking applications, financial applications, educational applications, gaming applications, entertainment applications, weather applications, healthcare applications, and the like. Application development is the process of conceiving, specifying, designing, programming, documenting, testing, and bug fixing while creating an application. Application development includes all that is involved between the conception of the desired application through to the final manifestation of the application in a planned and structured process. An application may be developed for a variety of reasons, such as, for example, to meet a business need or a personal need. Agile application development involves a collaborative effort of self-organizing and cross-functional teams to meet a particular need. Agile application development advocates adaptive planning, evolutionary development, early delivery, and continual improvement and encourages flexible responses to change.

SUMMARY

According to one illustrative embodiment, a computer-implemented method for building a user interface of an application under development is provided. A computer connects a data field to each label user interface component within a respective column user interface component. The computer displays a name of the data field connected to a respective label user interface component in a canvas area of an application development workspace. The computer renders data of the data field connected to each respective label user interface component in the canvas area of the application development workspace enabling a user to preview a look of the user interface of the application under development during application design time before implementation. The computer builds the user interface of the application under development in response to receiving an input from the user to build the user interface after previewing the look of the user interface. According to another illustrative embodiment, a computer system for building a user interface of an application under development is provided. The computer system comprises a bus system, a storage device storing program instructions connected to the bus system, and a processor executing the program instructions connected to the bus system. The computer system connects a data field to each label user interface component within a respective column user interface component. The computer system displays a name of the data field connected to a respective label user interface component in a canvas area of an application development workspace. The computer system renders data of the data field connected to each respective label user interface component in the canvas area of the application development workspace enabling a user to preview a look of the user interface of the application under development during application design time before implementation. The computer system builds the user interface of the application under development in response to receiving an input from the user to build the user interface after previewing the look of the user interface.

According to another illustrative embodiment, a computer program product for building a user interface of an application under development is provided. The computer program product comprises a computer readable storage medium having program instructions embodied therewith, the program instructions executable by a computer to cause the computer to perform a method. The computer connects a data field to each label user interface component within a respective column user interface component. The computer displays a name of the data field connected to a respective label user interface component in a canvas area of an application development workspace. The computer renders data of the data field connected to each respective label user interface component in the canvas area of the application development workspace enabling a user to preview a look of the user interface of the application under development during application design time before implementation. The computer builds the user interface of the application under development in response to receiving an input from the user to build the user interface after previewing the look of the user interface.

BRIEF DESCRIPTION OF THE DRAWINGS

FIGS. 14A-14C are a flowchart illustrating a process for automatically providing column guides on an application development workspace canvas to guide a user in building a user interface of an application under development in accordance with an illustrative embodiment.

DETAILED DESCRIPTION

Figure 1:
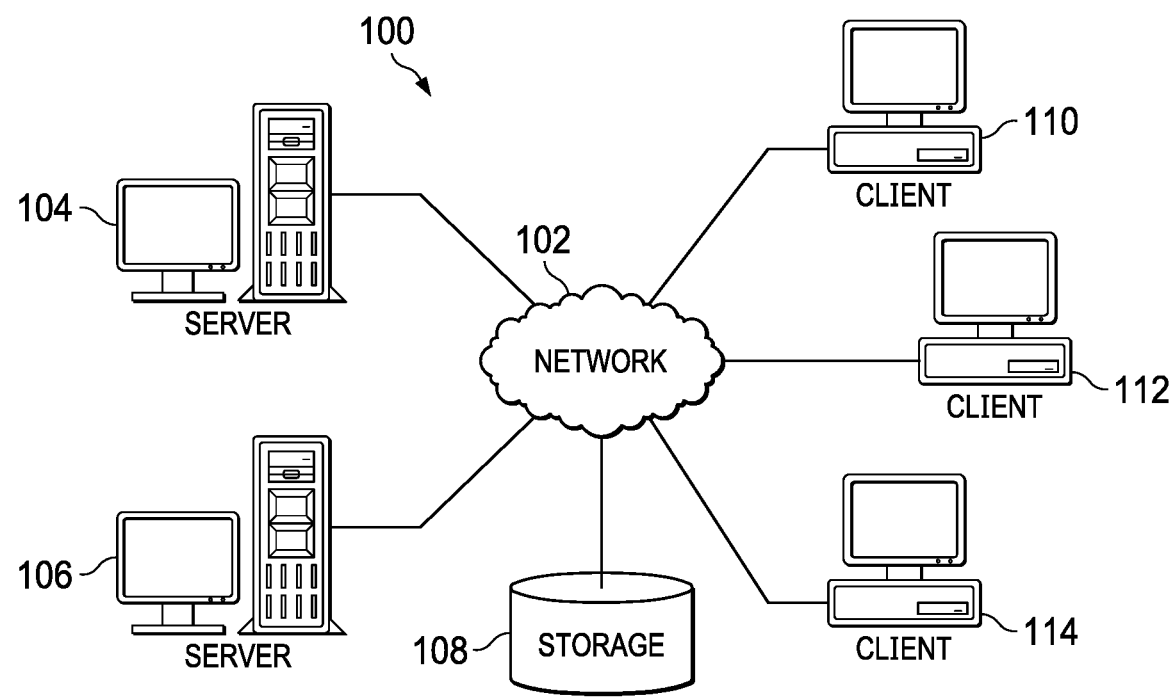
FIG. 1 is a pictorial representation of a network of data processing systems in which illustrative embodiments may be implemented.
Figure 2:
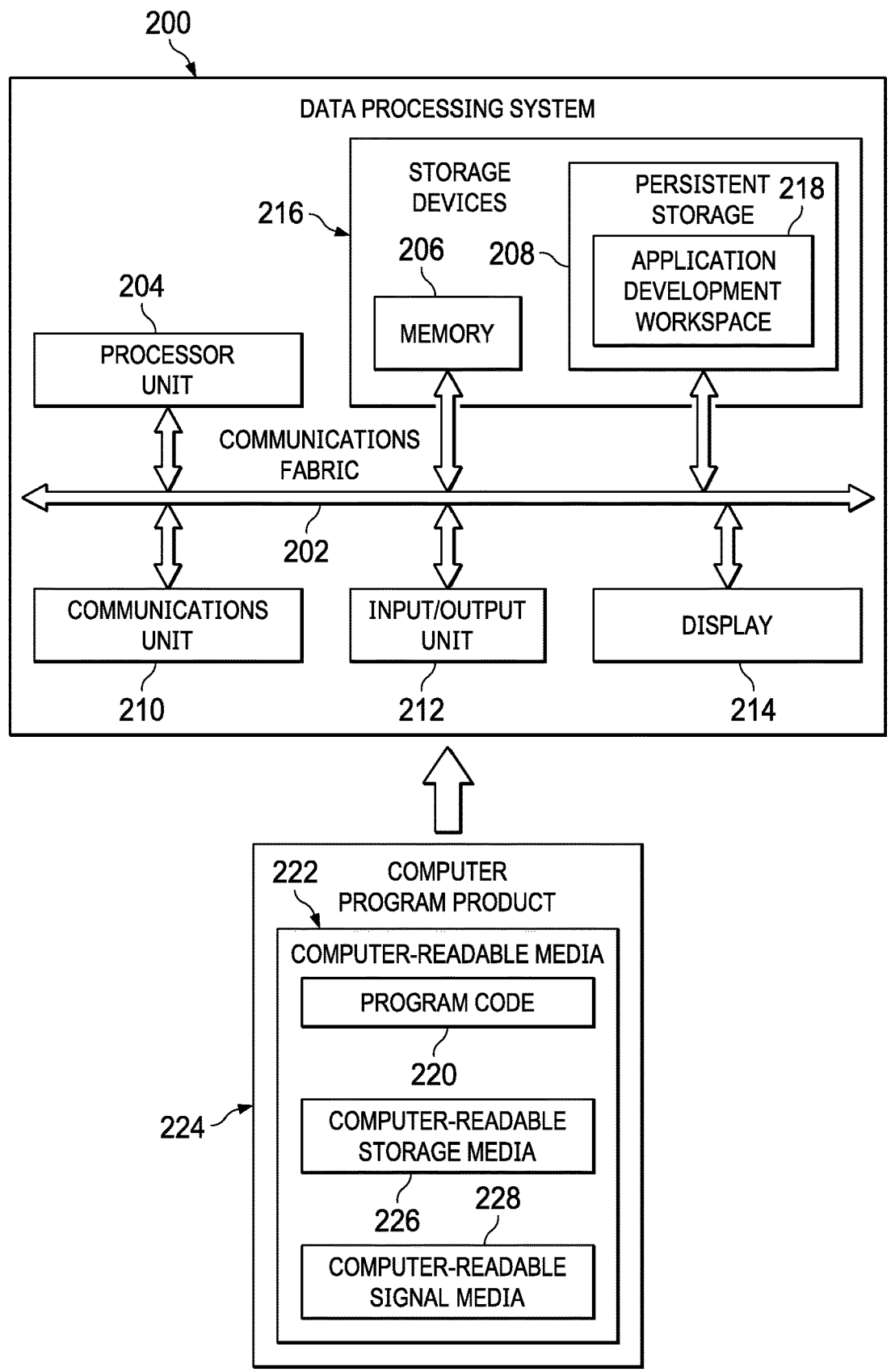
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 are application development platforms that provide an improved application development service to client device users via an application development workspace of illustrative embodiments having a predetermined number of column guides for guiding the client device users in building user interface components of an application under development without coding, which decreases building time and development costs. Further, the improved application development service of illustrative embodiments enables the client device users to visualize the actual data of connected data fields in corresponding user interface components during design time of the application enabling the client device users to see which data source is connected to each respective user interface component in real time before implementation. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart televisions, and the like, with wire or wireless communication links to network 102. Users of clients 110, 112, and 114 may utilize clients 110, 112, and 114 to access and utilize the application development services provided by server 104 and server 106. Furthermore, server 104 and server 106 may provide information, such as, for example, applications, programs, files, data, and the like, to clients 110, 112, and 114.

Storage 108 is a network storage device capable of storing any type of data in a structured format or an unstructured format. In addition, storage 108 may represent a plurality of network storage devices. Further, storage 108 may represent a connected data source for providing data to server 104 and server 106 for rendering that data within user interface components of an application under development.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

As used herein, when used with reference to items, "a number of" means one or more items. For example, "a number of different types of communication networks" is one or more different types of communication networks. Similarly, "a set of," when used with reference to items, means one or more of those items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 or server 106 in FIG. 1, in which computer readable program code or instructions implementing application development processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or medium is any piece of hardware that is capable of storing information, such as, for example, without limitation, data, computer readable program instructions in functional form, and/or other suitable information either on a transient basis or a persistent basis. Further, a computer readable storage device or medium excludes a propagation medium, such as a transitory signal. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical drive, a rewritable magnetic tape, or some combination of the above. The media used by persistent storage 208 may be removable. For example, a removable hard drive may be used for persistent storage 208.

In this example, persistent storage 208 stores application development workspace 218. However, it should be noted that even though application development workspace 218 is illustrated as residing in persistent storage 208, in an alternative illustrative embodiment application development workspace 218 may be a separate component of data processing system 200. For example, application development workspace 218 may be a hardware component coupled to communication fabric 202 or a combination of hardware and software components. In another alternative illustrative embodiment, a first set of components of application development workspace 218 may be located in data processing system 200 and a second set of components of application development workspace 218 may be located in a second data processing system, such as, for example, server 106. In yet another alternative illustrative embodiment, application development workspace 218 may be located in a client device, such as, for example, client 110 in FIG. 1, in addition to, or instead of, data processing system 200.

Application development workspace 218 controls and guides the process of building user interface components of an application under development. Application development workspace 218 applies a predetermined number of column guides (e.g., 12 column guides) across a top of an entire width of a canvas area of application development workspace 218. A user of a client device utilizes the canvas area to build the user interface components of the application. The predetermined number of column guides guide the user in placement and size of the user interface components. Application development workspace 218 also enables the user to see within the canvas area actual data rendered inside each respective user interface component during design time as a preview before implementation.

As a result, data processing system 200 operates as a special purpose computer system in which application development workspace 218 in data processing system 200 enables application of column guides and visualization of rendered data within user interface components inside the canvas area during application design time. In particular, application development workspace 218 transforms data processing system 200 into a special purpose computer system as compared to currently available general computer systems that do not have application development workspace 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. In other words, computer readable storage media 226 exclude a propagation medium, such as transitory signals. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Utilizing illustrative embodiments, users (e.g., application developers and designers) of an application development platform, such as, for example, Lifion Development Platform, which is a product of Automatic Data Processing, Inc. of New Jersey, can immediately see what the users are building while the users are building the application. Illustrative embodiments provide an application development workspace where users in real time can view and understand the layout and look of user interface components of an application that the users are building. In addition, illustrative embodiments enable users to see which data source is connected to each respective data field of a set of user interface components corresponding to the application being developed, as compared to current application development workspaces, such as, for example, Integrated Development Environments, available in the industry today, which do not allow user to see data fields of connected data sources. Further, illustrative embodiments enable users to validate data displayed on the user interface components within the application development workspace of illustrative embodiments in real time by allowing the users to see the source of the data (e.g., tables), which is powering the user interface components, and to see how the data is populated within the user interface, enabling the users to build user interfaces with decreased effort and time. Furthermore, illustrative embodiments enable new users of an application development team to be quickly onboarded regarding the current state of an application's development lifecycle.

The application development workspace of illustrative embodiments is targeted towards users (e.g., application developers and designers) that have multiple skill sets. However, some of these users may have little to no background in computer software development. Illustrative embodiments make it easier for this type of user to develop applications by allowing users to drag and drop predefined graphical element blocks containing pre-built features onto the application development workspace to start building an application without application coding being performed by the users.

Illustrative embodiments take into consideration that using current application development spaces available in the industry today to build user interface components for application projects is not ideal because these current application development workspaces do not provide users with an ability to see what the users are building in real time, which would provide the users with an improved application development experience. For example, when a user connects or links a data source to a user interface component of an application under development using current application development spaces, these current application development workspaces are not capable of rendering the data of the data source inside the application development workspace because application design time and application run time are different environments. As a result, is difficult for a user to know whether or not the user connected the correct data source to a corresponding user interface component (e.g., data field) when developing an application using a current application development workspace. Further, current application development workspaces do not provide an ability for new users of an application development team to be quickly onboarded.

Illustrative embodiments utilize a predefined number of column guides, such as, for example, 12 column guides, to generate a responsive application development workspace. It should be noted that illustrative embodiments may automatically apply any number of column guides, such as, for example, 8, 10, 12, 14, 16, or the like, to the application development workspace. Illustrative embodiments automatically apply the predefined number of column guides (e.g., 12 column guides) to a set of user interface components or objects, such as, for example, sections and rows, selected by a user in the application development workspace. In addition, user-selected user interface components may not utilize all available space within the application development workspace. Consequently, it may be difficult for users utilizing current application development workspaces to build a user interface where column guides do not exist and not all available space is utilized within the application development workspace by user interface components. To address this issue, illustrative embodiments utilize a "What You See is What You Get" application development workspace as a user interface component building tool to automatically add the predefined number of column guides, which are contextually-aware and auto-adjusted, so that illustrative embodiments can provide the appropriate column guidance to users at all times while building user interface components. The predefined number of column guides are contextually-aware and auto-adjusted by illustrative embodiments based on the user interface component (e.g., section or row) selected by the user in the application development workspace.

Further, illustrative embodiments address the issue of rendering data of a connected data source in a corresponding user interface component during the application design time environment by applying three different states to a user interface component. The three states of a user interface component include an empty-data state, a with-data state, and a data-render state. The empty-data state is when a user interface component (e.g., data field) is not connected to a particular data source by a user. The with-data state is when the user interface component is connected to a particular data source by the user. The data-render state is when illustrative embodiments display the data, themselves, of that particular data source within the user interface component in the application development workspace during application design time.

When a user drags and drops a selected user interface component graphical element block onto the application development workspace of illustrative embodiments, illustrative embodiments show a default styling of that user interface component on the application development workspace canvas. For example, when a user drags and drops a new label (e.g., text) user interface component graphical element block onto the application development workspace, illustrative embodiments display the text "New Label" on that new user interface component within the application development workspace. When the user connects a particular data source, such as, for example, a "first name" data field of that particular data source to that new user interface component, illustrative embodiments transform the text "New Label" to "First.Name," which is the data field inside that particular data source. This gives the user the ability to quickly scan through the entire application development workspace in real time and understand which data fields are connected to which user interface components placed by the user on the application development workspace canvas. This default styling can be changed in any way that the user desires in the empty-data state or the with-data state. In the data-render state, illustrative embodiments render the data from the data source within the user interface component by changing, for example, "First.Name" to "Jane," which illustrative embodiments retrieved from the connected data source for that particular user interface component. This rendering of the data in real time within the application design time environment is a unique characteristic of illustrative embodiments as compared to the current application development workspaces in the industry today. As a result, illustrative embodiments provide an improved application development workspace.

Thus, illustrative embodiments provide one or more technical solutions that overcome a technical problem with building graphical user interface components of an application under development. As a result, these one or more technical solutions provide a technical effect and practical application in the field of software development.

Figure 3:
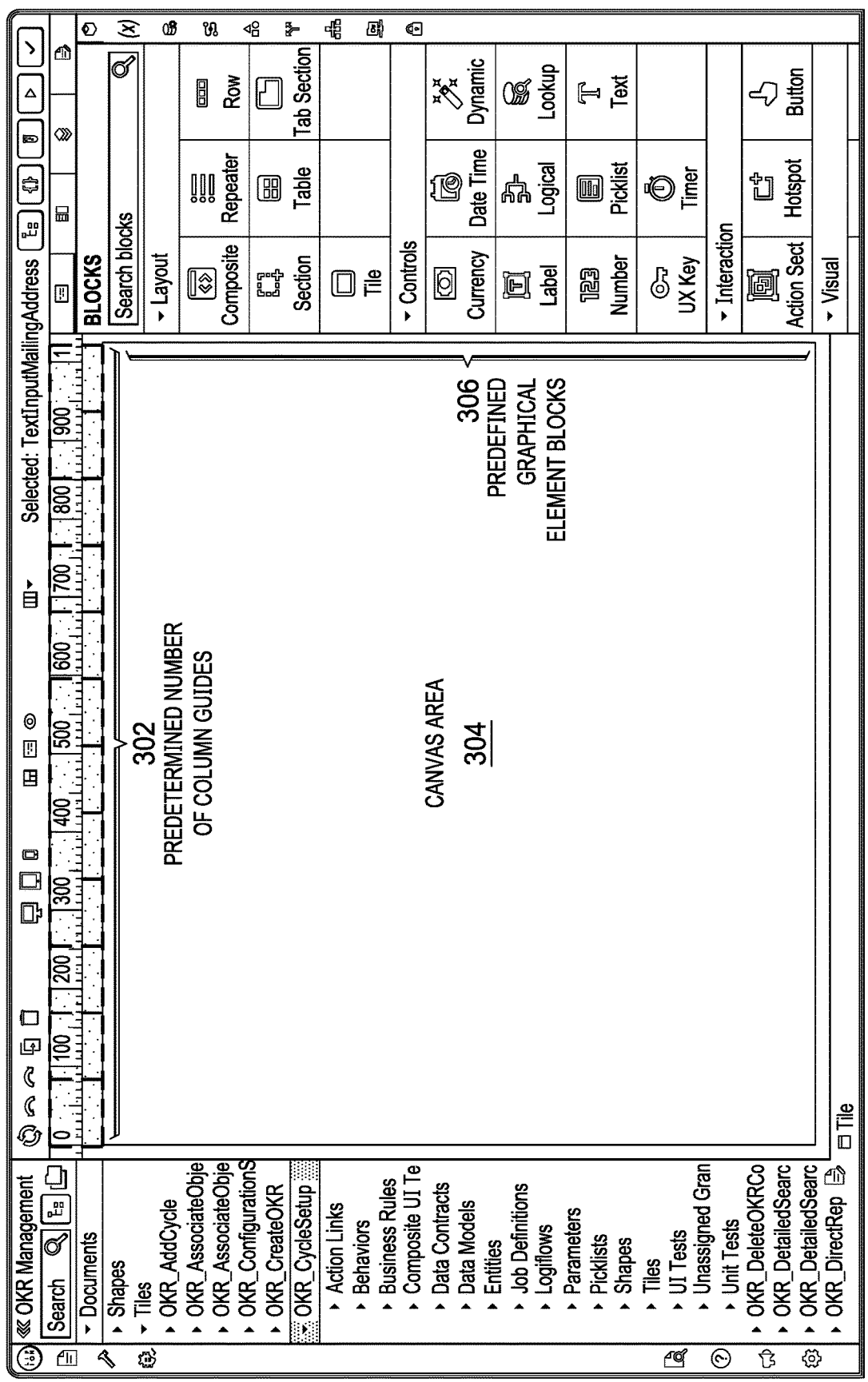
FIG. 3 is a diagram illustrating an example of an application development workspace showing an empty canvas with a predetermined number of column guides in accordance with an illustrative embodiment.

With reference now to FIG. 3, a diagram illustrating an example of an application development workspace showing an empty canvas with a predetermined number of column guides is depicted in accordance with an illustrative embodiment. Application development workspace 300 may be, for example, application development workspace 218 in FIG. 2. Application development workspace 300 may be implemented in a computer, such as, for example, server 104 in FIG. 1 or data processing system 200 in FIG. 2.

In this example, a user of a client device, such as, for example, client 110 in FIG. 1, is developing an Objectives and Key Results (OKR) Management application. In response to opening application development workspace 300 upon receiving an input from the user, illustrative embodiments automatically apply predetermined number of column guides 302 across a top of an entire width of canvas area 304. In this example, predetermined number of column guides 302 equals 12 column guides. However, it should be noted that an alternative illustrative embodiment may apply a different number of column guides, such as, for example, 5, 6, 7, 8, 9, 10, 11, 13, 14, 15, 16, or the like. Also, it should be noted that predetermined number of column guides 302 are contextually-aware and automatically adjusted based on a user interface component selected by the user from predefined graphical element blocks 306. In this example, predefined graphical element blocks 306 include user interface components for: layout, such as tile, section, and row; control, such as label and text; and interaction, such as button and action section. Each of predefined graphical element blocks 306 contains pre-built features, which the user may drag and drop onto canvas area 304 using a computer mouse or touch screen, to build user interface components of the application under development. However, it should be noted that predefined graphical element blocks 306 are meant as examples only and not as limitation on alternative illustrative embodiments. In other words, predefined graphical element blocks 306 may include any number and type of predefined graphical element blocks.

Figure 4:
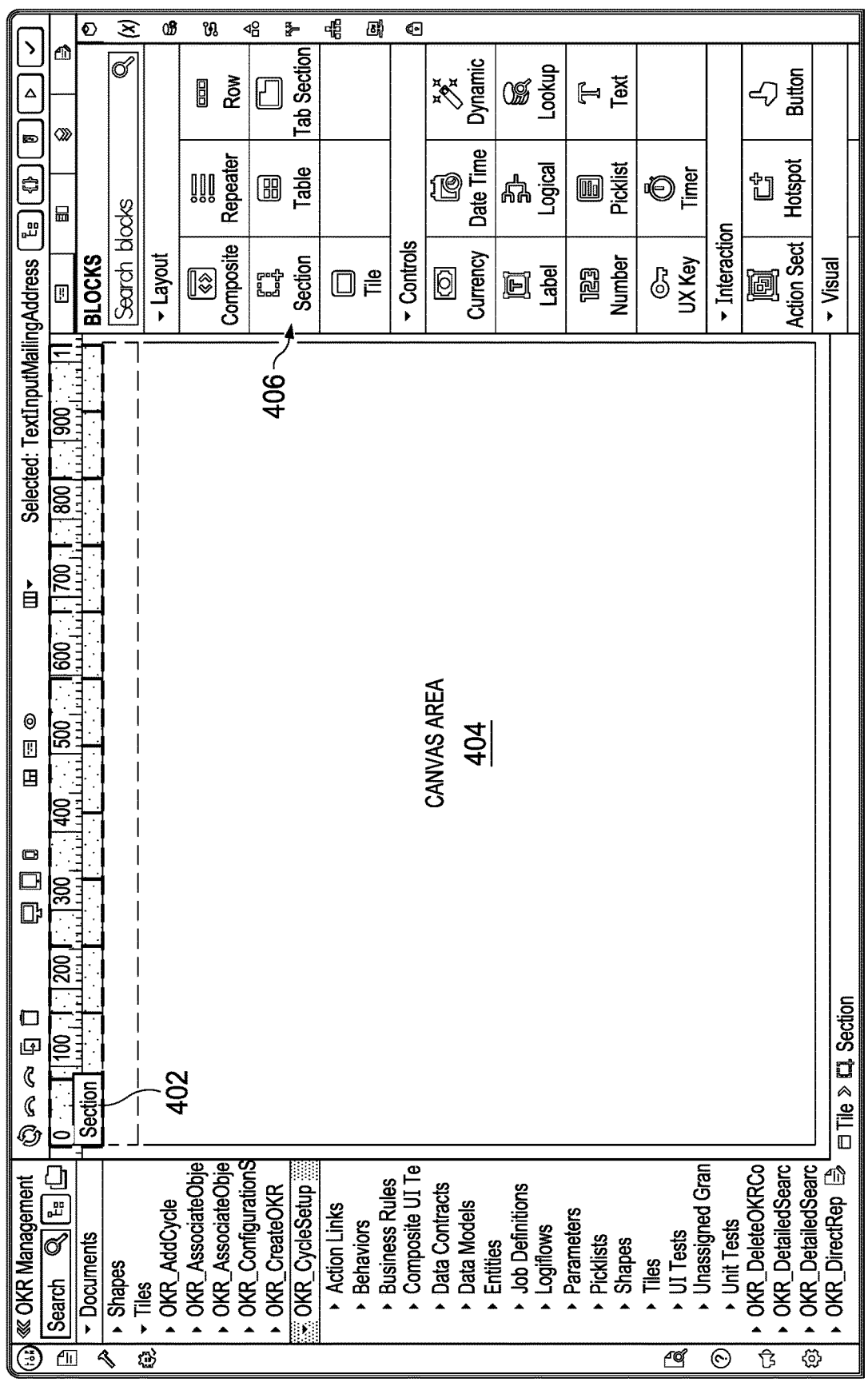
FIG. 4 is a diagram illustrating an example of an application development workspace showing addition of a section user interface component to the canvas in accordance with an illustrative embodiment.

With reference now to FIG. 4, a diagram illustrating an example of an application development workspace showing addition of a section user interface component to the canvas is depicted in accordance with an illustrative embodiment. Application development workspace 400 may be, for example, application development workspace 300 in FIG. 3. In this example, the user adds section user interface component 402 onto canvas area 404, such as, canvas area 304 in FIG. 3. For example, the user utilizes predefined graphical element block 406 "Section" to drag and drop section user interface component 402 onto canvas area 404. Illustrative embodiments automatically adjust a size of section user interface component 402 in accordance with the predetermined number of column guides, such as predetermined column guides 302 in FIG. 3. In this example, the size of section user interface component 402 is equal to the entire length of the predetermined number of column guides.

Figure 5:
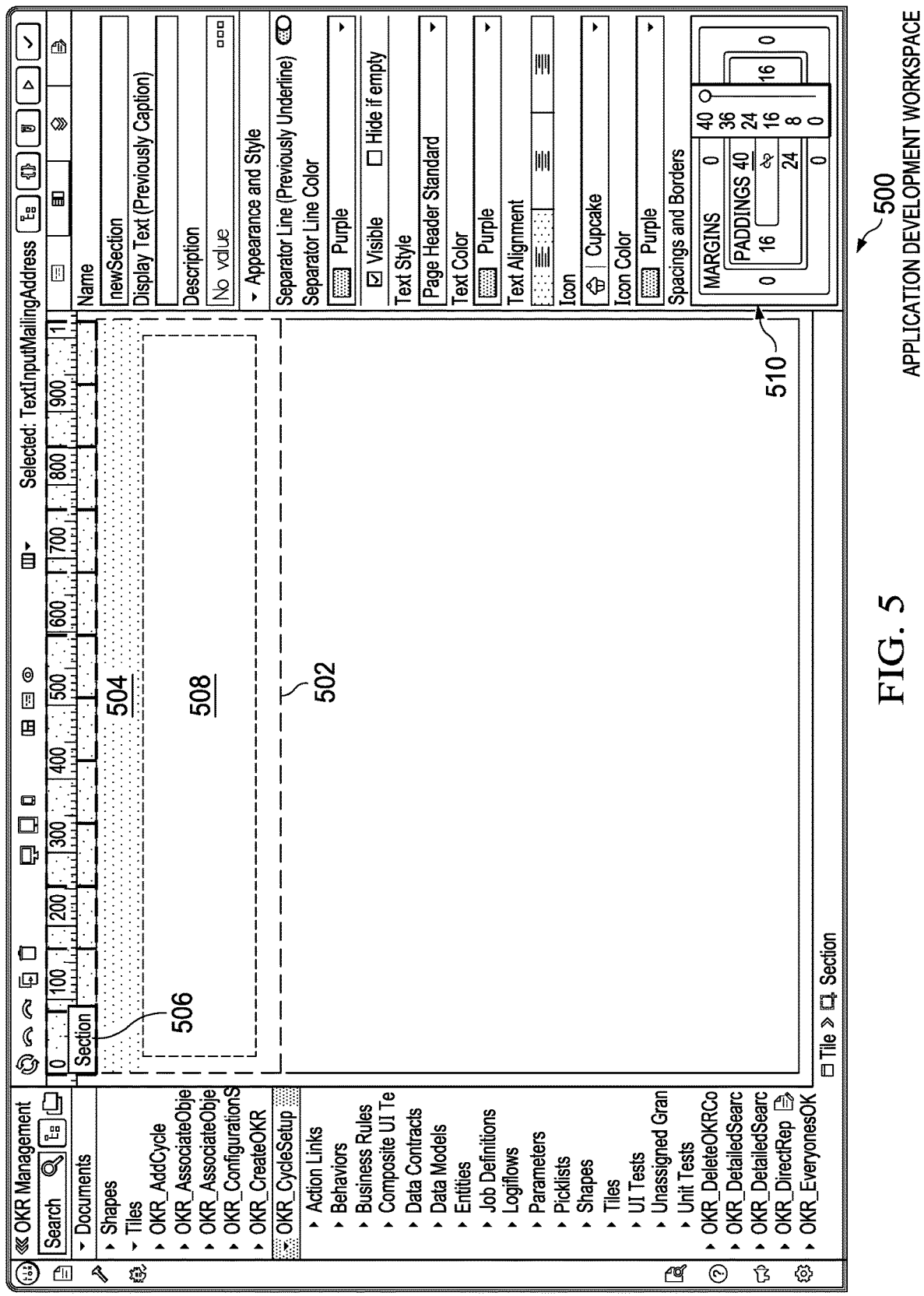
FIG. 5 is a diagram illustrating an example of an application development workspace showing adjustments to margins and paddings of the section user interface component in accordance with an illustrative embodiment.

With reference now to FIG. 5, a diagram illustrating an example of an application development workspace showing adjustments to margins and paddings of the section user interface component is depicted in accordance with an illustrative embodiment. Application development workspace 500 may be, for example, application development workspace 400 in FIG. 4. In this example, the user adjusts margins 502 and paddings 504 of section user interface component 506, such as section user interface component 402 in FIG. 4. Margins 502 represent outer edges of section user interface component 506. Paddings 504 represent spacings between margins 502 and inner data area 508 of section user interface component 506 that are used for data spacing, such as, for example, spacing of text. The user adjusts margins 502 and paddings 504 using spacings and borders adjuster 510 in an appearance and style controls area of application development workspace 500.

Figure 6:
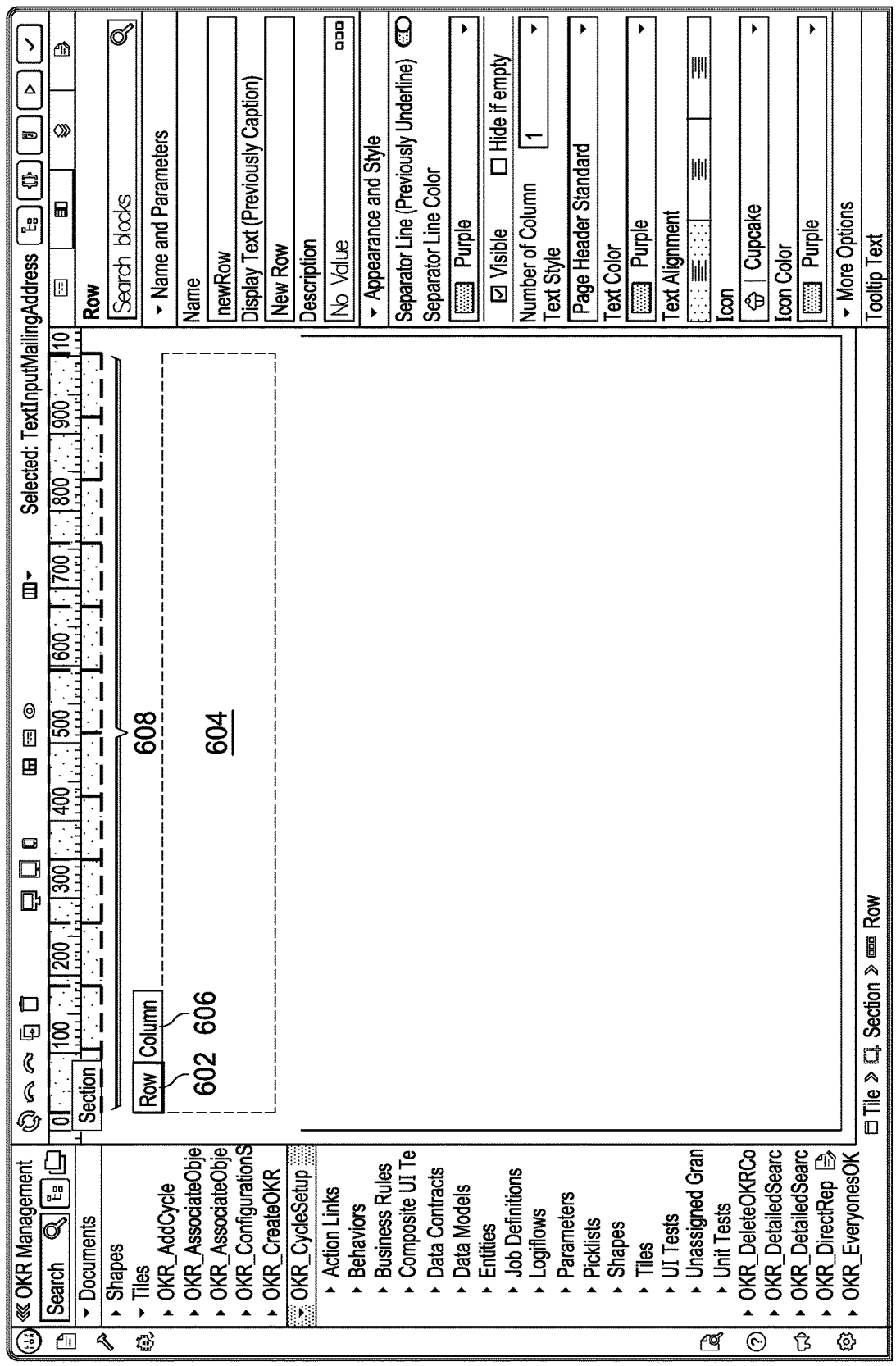
FIG. 6 is a diagram illustrating an example of an application development workspace showing addition of a row and a column user interface component to the section user interface component in accordance with an illustrative embodiment.

With reference now to FIG. 6, a diagram illustrating an example of an application development workspace showing addition of a row and a column user interface component to the section user interface component is depicted in accordance with an illustrative embodiment. Application development workspace 600 may be, for example, application development workspace 500 in FIG. 5. In this example, the user adds row user interface component 602 to inner data area 604, such as inner data area 508 of section user interface component 506 in FIG. 5. In response to addition of row user interface component 602 on the canvas area of application development workspace 600, illustrative embodiments automatically add column user interface component 606 based on a default setting. It should be noted that row user interface components 602 utilizes all of inner data area 604 of the section user interface component. Illustrative embodiments automatically adjust an overall length of predetermined number of column guides 608, such as predetermined number of column guides 302 in FIG. 3, based on a width of row user interface component 602. It should be noted that the width of row user interface component 602 is less than the entire width of the section user interface component and canvas area.

Figure 7:
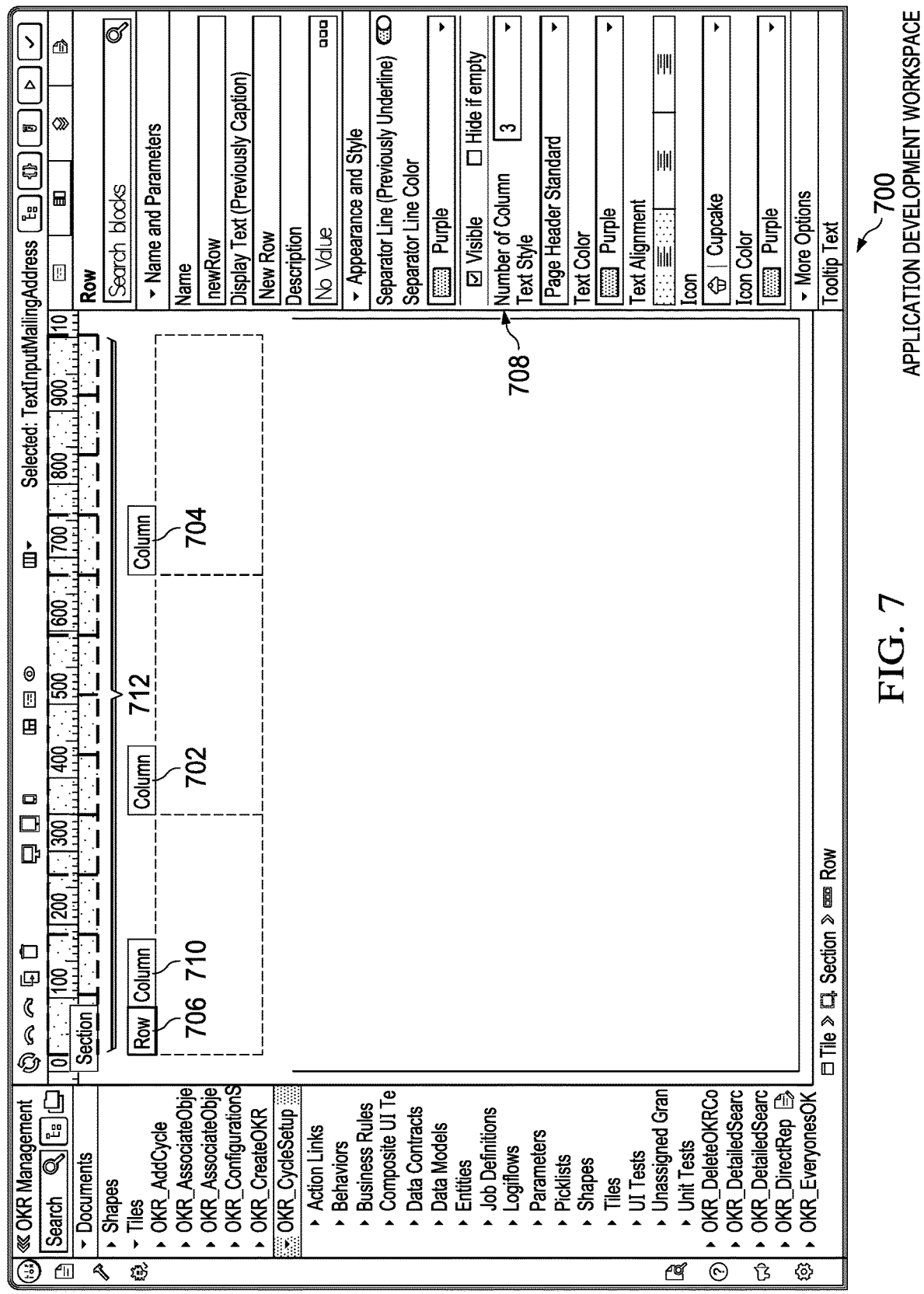
FIG. 7 is a diagram illustrating an example of an application development workspace showing addition of a set of additional column user interface components to the row user interface component in accordance with an illustrative embodiment.

With reference now to FIG. 7, a diagram illustrating an example of an application development workspace showing addition of a set of additional column user interface components to the row user interface component is depicted in accordance with an illustrative embodiment. Application development workspace 700 may be, for example, application development workspace 600 in FIG. 6. In this example, the user adds a set of additional column user interface components, such as column user interface component 702 and column user interface component 704, to row user interface component 706 using number of columns controller 708 in the appearance and style controls area of application development workspace 700. It should be noted that column user interface component 710, such as column user interface component 606 in FIG. 6, was previously added by illustrative embodiments automatically based on the default setting. Also, it should be noted that illustrative embodiments automatically adjust column user interface components 702, 704, and 710 to be of equal size across the overall length of predetermined number of column guides 712, such as predetermined number of column guides 608 in FIG. 6.

Figure 8:
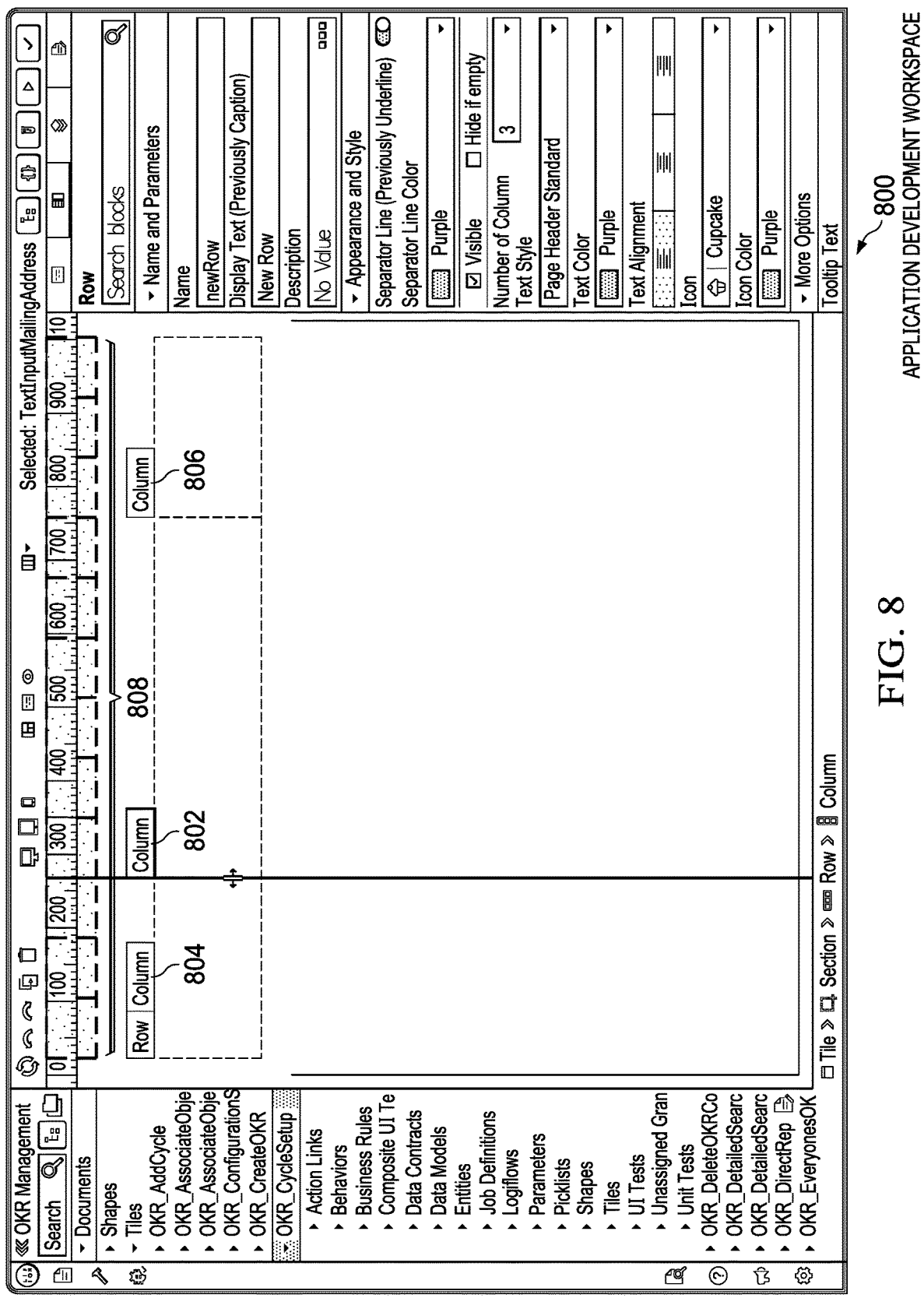
FIG. 8 is a diagram illustrating an example of an application development workspace showing size adjustment to a center column user interface component within the row user interface component in accordance with an illustrative embodiment.

With reference now to FIG. 8, a diagram illustrating an example of an application development workspace showing size adjustment to a center column user interface component within the row user interface component is depicted in accordance with an illustrative embodiment. Application development workspace 800 may be, for example, application development workspace 700 in FIG. 7. In this example, the user manually increases a size of center column user interface component 802, such as column user interface component 702 in FIG. 7, which in turn decreases a size of user interface components 804 and 806. However, it should be noted that illustrative embodiments automatically adjust or snap the resizing of center column user interface component 802 to a nearest one of predetermined number of column guides 808 as the user manually moves the border of center column user interface component 802. In other words, illustrative embodiments automatically regulate user interface component size adjustment in accordance with edges of the predetermined number of column guides (i.e., a border of a user interface component cannot be placed in between column guide edges).

Figure 9:
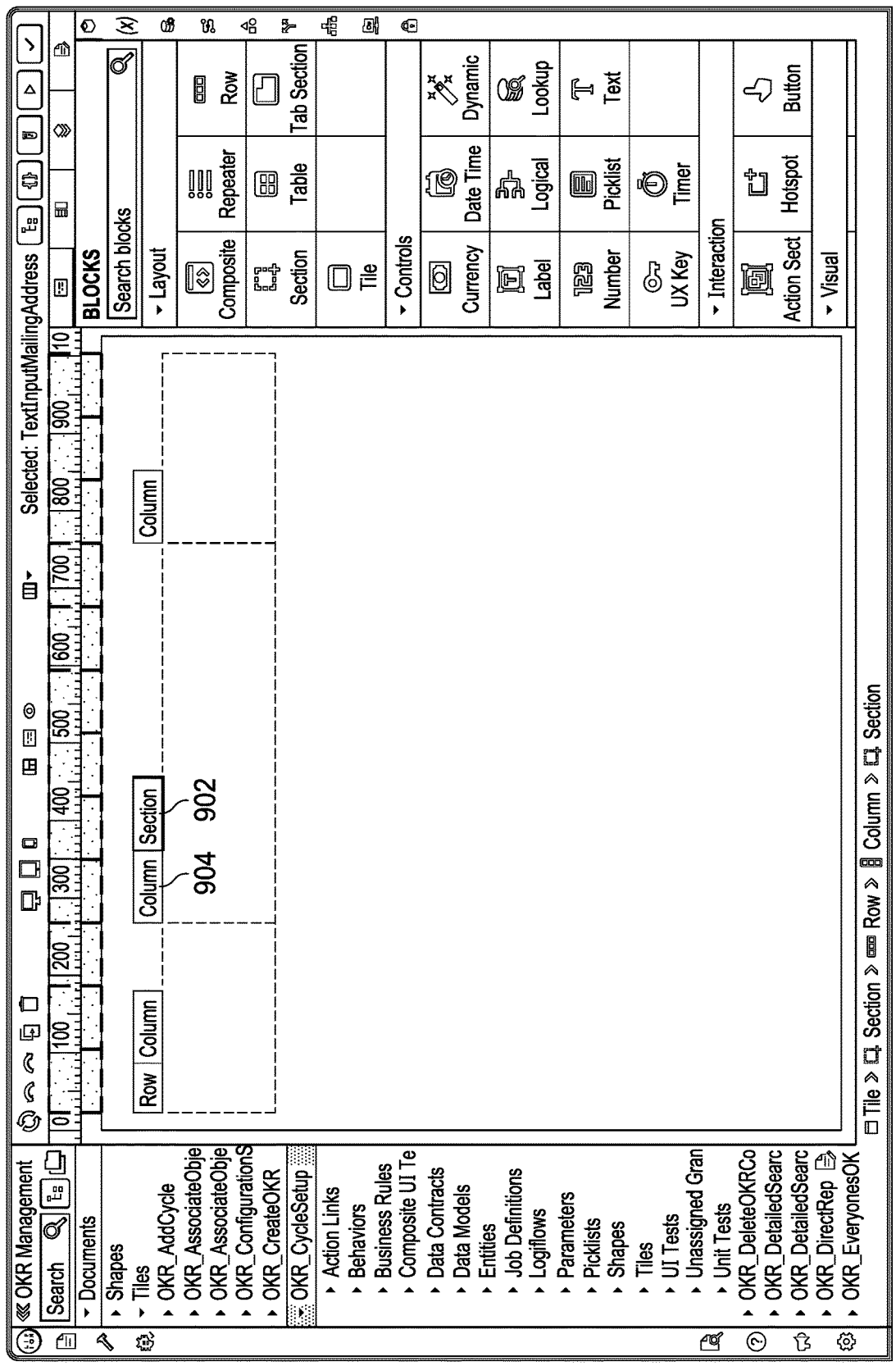
FIG. 9 is a diagram illustrating an example of an application development workspace showing addition of a second section user interface component to the center column user interface component in accordance with an illustrative embodiment.

With reference now to FIG. 9, a diagram illustrating an example of an application development workspace showing addition of a second section user interface component to the center column user interface component is depicted in accordance with an illustrative embodiment. Application development workspace 900 may be, for example, application development workspace 800 in FIG. 8. In this example, the user adds second section user interface component 902 to center column user interface component 904, such as center user interface component 802 in FIG. 8. It should be noted that in order to add row and column user interface components, a section user interface component has to be added first.

Figure 10:
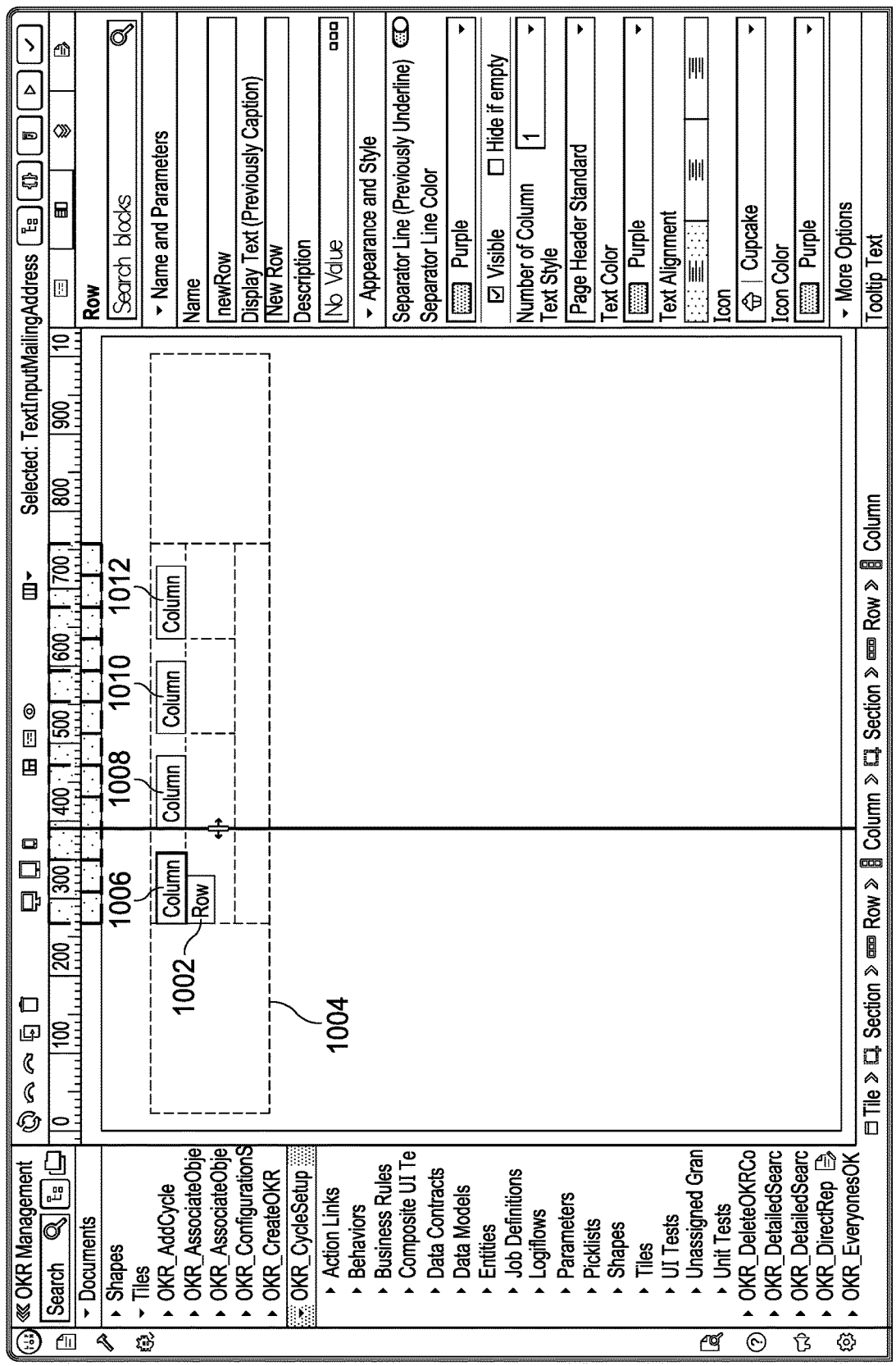
FIG. 10 is a diagram illustrating an example of an application development workspace showing addition of a row and multiple column user interface components within the second section user interface component in accordance with an illustrative embodiment.

With reference now to FIG. 10, a diagram illustrating an example of an application development workspace showing addition of a row and multiple column user interface components within the second section user interface component is depicted in accordance with an illustrative embodiment. Application development workspace 1000 may be, for example, application development workspace 900 in FIG. 9. In this example, the user adds row user interface component 1002 to section user interface component 1004, such as section user interface component 902 in FIG. 9. Illustrative embodiments automatically add column user interface component 1006 based on the default setting. The user also adds additional column user interface components 1008, 1010, and 1012 to section user interface component 1004. Illustrative embodiments automatically adjust a size of column user interface components 1006, 1008, 1010, and 1012 within section user interface component 1004 based on the column guides corresponding to section user interface component 1004.

Figure 11:
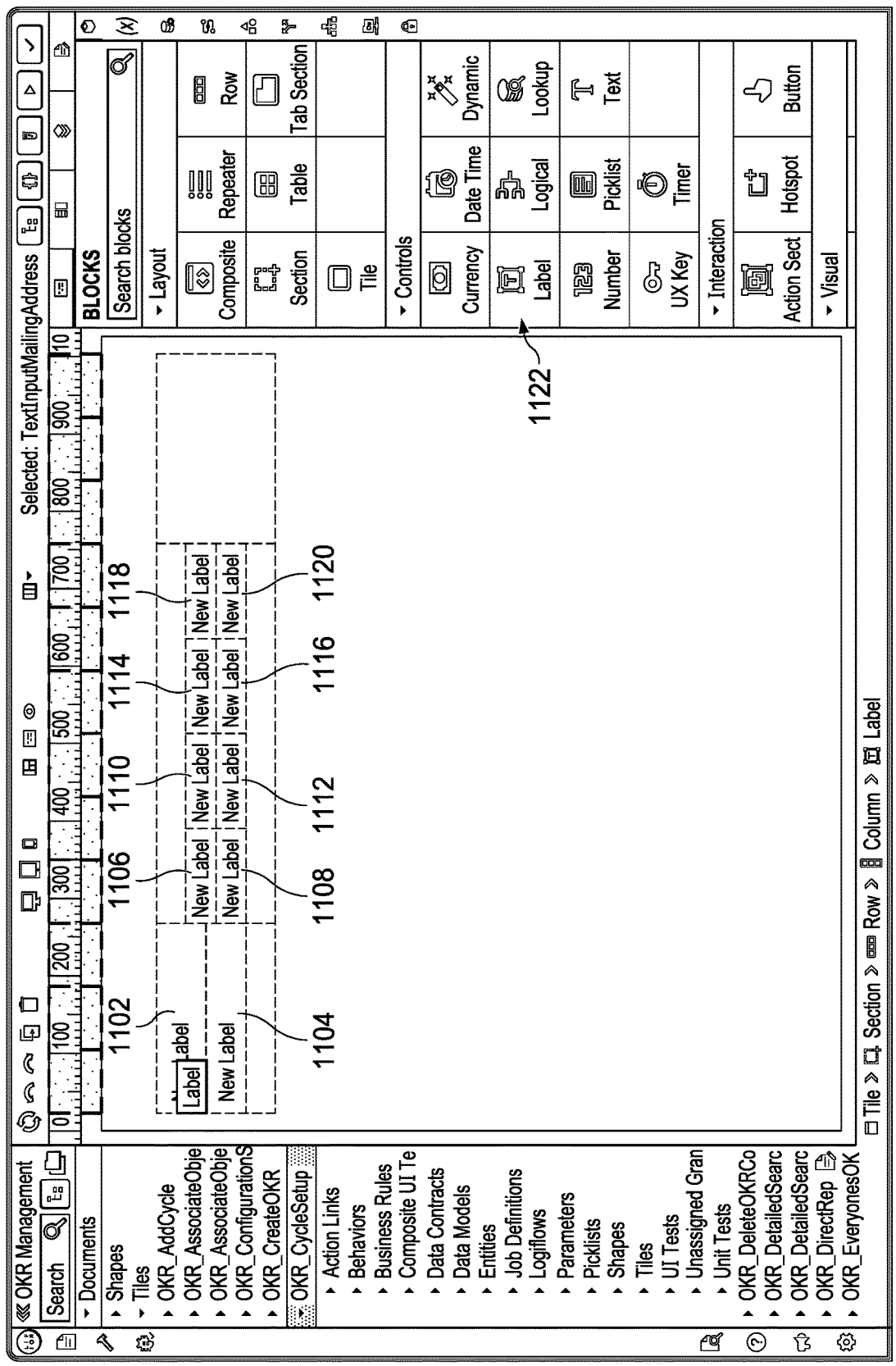
FIG. 11 is a diagram illustrating an example of an application development workspace showing addition of labels to each added user interface component in accordance with an illustrative embodiment.

With reference now to FIG. 11 is a diagram illustrating an example of an application development workspace showing addition of labels to each added user interface component is depicted in accordance with an illustrative embodiment. Application development workspace 1100 may be, for example, application development workspace 1000 in FIG. 10. In this example, the user adds new labels 1102, 1104, 1106, 1108, 1110, 1112, 1114, 1116, 1118, and 1120 to selected column user interface components, such as column user interface component 804 in FIG. 8 and column user interface components 1006, 1008, 1010, and 1012 in FIG. 10, using predefined graphical element block 1122 "Label" in a controls area of application development workspace 1100.

Figure 12:
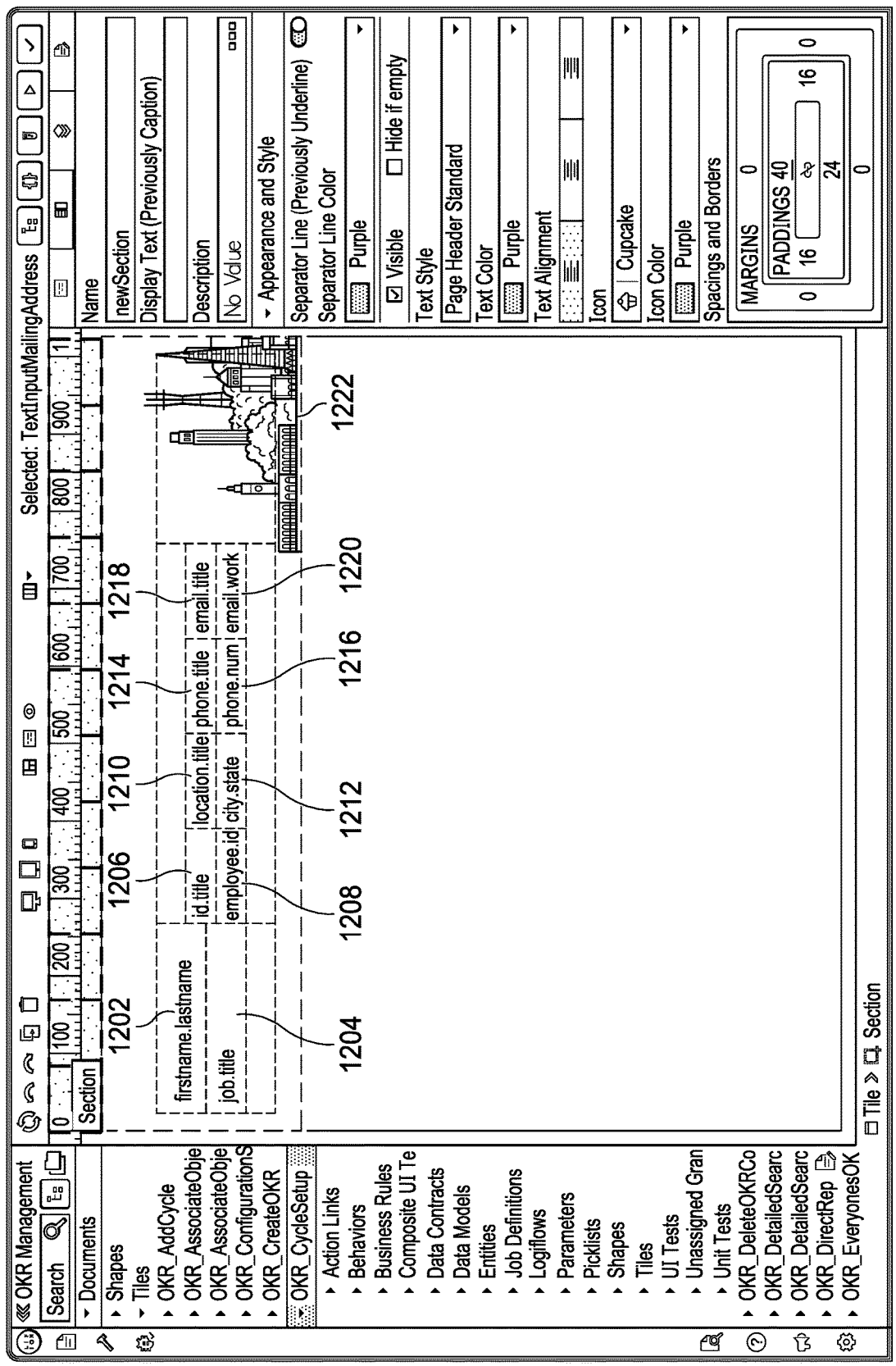
FIG. 12 is a diagram illustrating an example of an application development workspace showing connection of data fields to corresponding labels of each added user interface component in accordance with an illustrative embodiment.

With reference now to FIG. 12, a diagram illustrating an example of an application development workspace showing connection of data fields to corresponding labels of each added user interface component is depicted in accordance with an illustrative embodiment. Application development workspace 1200 may be, for example, application development workspace 1100 in FIG. 11. In this example, the user connects data fields 1202, 1204, 1206, 1208, 1210, 1212, 1214, 1216, 1218, and 1220 of a selected data source, such as storage 108 in FIG. 1, to corresponding labels, such as new labels 1102, 1104, 1106, 1108, 1110, 1112, 1114, 1116, 1118, and 1120 in FIG. 11, of respective column user interface components. As a result, illustrative embodiments display the text of linked data fields within each respective column user interface component on the canvas area. Consequently, the user knows which data field is connected to which user interface component. In addition, the user adds graphical icon 1222 to a remaining column user interface component, such as column user interface component 806 in FIG. 8.

Figure 13:
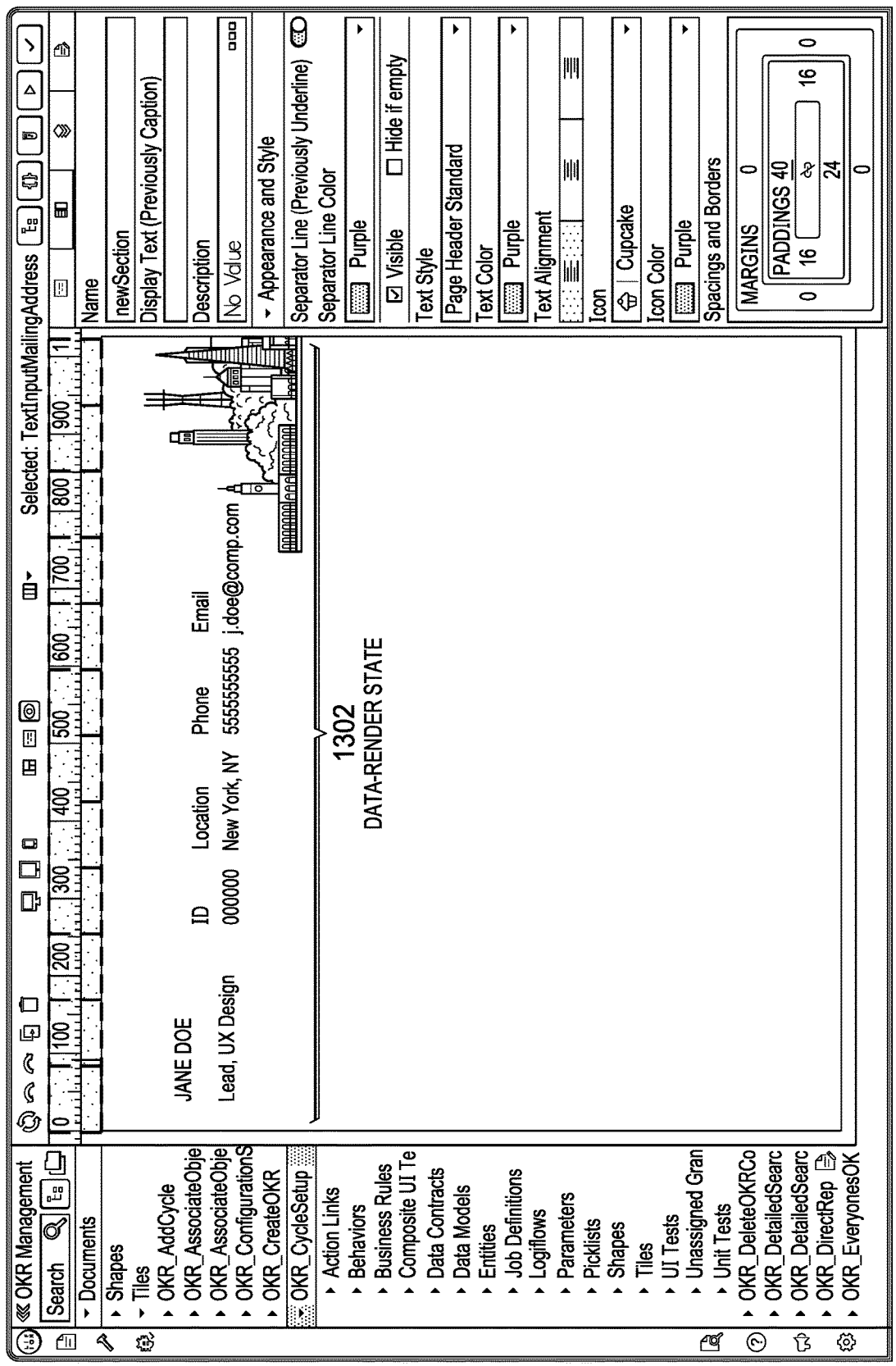
FIG. 13 is a diagram illustrating an example of an application development workspace displaying the actual data of the connected data fields within each corresponding user interface component in accordance with an illustrative embodiment.

With reference now to FIG. 13, a diagram illustrating an example of an application development workspace displaying the actual data of the connected data fields within each corresponding user interface component is depicted in accordance with an illustrative embodiment. Application development workspace 1300 may be, for example, application development workspace 1200 in FIG. 12. Illustrative embodiments render and display the actual data of the connected data fields, such as data fields 1202, 1204, 1206, 1208, 1210, 1212, 1214, 1216, 1218, and 1220 in FIG. 12, within each corresponding user interface component in data-render state 1302 as an application design time preview before implementation.

Figure 14A:
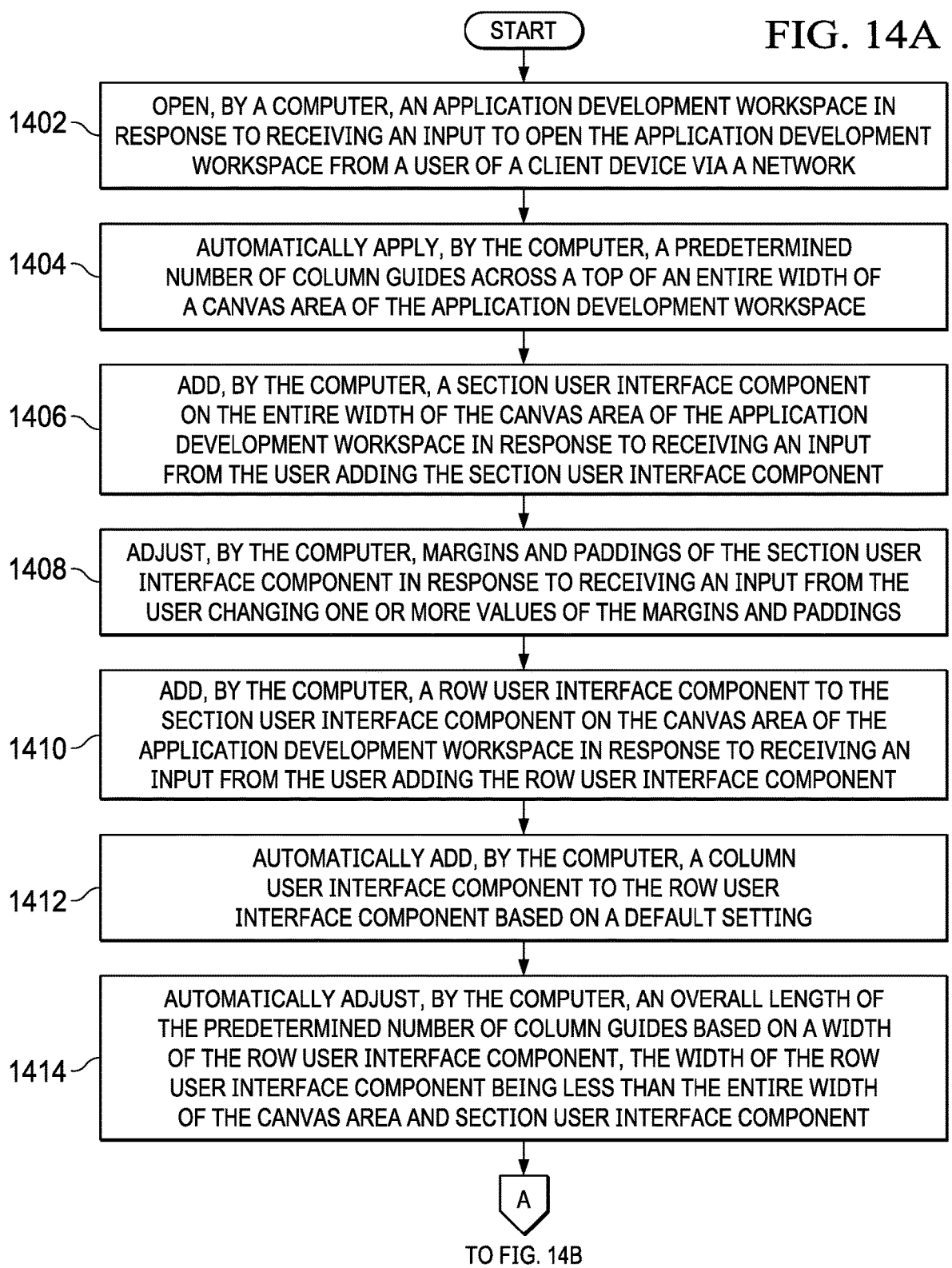

With reference now to FIGS. 14A-14C, a flowchart illustrating a process for automatically providing column guides on an application development workspace canvas to guide a user in building a user interface of an application under development is shown in accordance with an illustrative embodiment. The process shown in FIGS. 14A-14C may be implemented in a computer, such as, for example, server 104 in FIG. 1 or data processing system 200 in FIG. 2. For example, the process can be implemented in application development workspace 218 in FIG. 2.

The process begins when the computer opens an application development workspace in response to receiving an input to open the application development workspace from a user of a client device via a network (step 1402). The application development workspace may be, for example, application development workspace 300 in FIG. 3. The client device may be, for example, client 110 in FIG. 1. The network may be, for example, network 102 in FIG. 1.

In response to the computer opening the application development workspace, the computer automatically applies a predetermined number of column guides across a top of an entire width of a canvas area of the application development workspace (step 1404). The predetermined number of column guides may be, for example, predetermined number of column guide 302 across the top of the entire width of canvas area 304 in FIG. 3. Also, the number of the predetermined number of column guides may be, for example, 12.

The computer adds a section user interface component, such as section user interface component 402 in FIG. 4, on the entire width of the canvas area of the application development workspace in response to receiving an input from the user adding the section user interface component (step 1406). The computer adjusts margins and paddings of the section user interface component in response to receiving an input from the user changing one or more values of the margins and paddings (step 1408). The margins and paddings may be, for example, margins 502 and paddings 504 in FIG. 5.

The computer adds a row user interface component, such as row user interface component 602 in FIG. 6, to the section user interface component on the canvas area of the application development workspace in response to receiving an input from the user adding the row user interface component (step 1410). The computer automatically adds a column user interface component, such as column user interface component 606 in FIG. 6, to the row user interface component based on a default setting (step 1412). The computer automatically adjusts an overall length of the predetermined number of column guides, such as predetermined number of column guides 608 in FIG. 6, based on a width of the row user interface component (step 1414). The width of the row user interface component is less than the entire width of the canvas area and section user interface component.

The computer adds a set of additional column user interface components, such as column user interface components 702 and 704 in FIG. 7, to the row user interface component in response to receiving an input from the user adding the set of additional column user interface components (step 1416). The computer automatically adjusts a size of each column user interface component added to the row user interface component in accordance with the automatically adjusted overall length of the predetermined number of column guides to complete a layout of a user interface of an application under development (step 1418).

The computer adds a label user interface component, such as new label 1102 in FIG. 11, within each column user interface component added to the row user interface component to display text inside each column user interface component in response to receiving an input from the user adding the label user interface component (step 1420). In addition, the computer changes attributes of the label user interface component within each respective column user interface component in response to receiving an input from the user changing the attributes of the label user interface component in order for the user to visualize a style applied to each respective label user interface component in the canvas area of the application development workspace to form an empty-data state (step 1422). Attributes of a label user interface component may include, for example, font size, thickness, color, and the like.

Further, the computer connects a particular data source and data field to each respective label user interface component within each respective column user interface component in response to receiving an input from the user connecting the particular data source and data field to each respective label user interface component within each respective column user interface component (step 1424).

Furthermore, the computer displays a name of the data field corresponding to the particular data source connected to a respective label user interface component in the canvas area of the application development workspace to form a with-data state (step 1426). Moreover, the computer renders data of each data field connected to each respective label user interface component in the canvas area of the application development workspace in response to receiving an input from the user to display the data to form a data-render state, such as data-render state 1302 in FIG. 13, enabling the user to preview a look of the user interface during application design time before implementation (step 1428). The computer builds the user interface of the application under development in response to receiving an input from the user to build the user interface after previewing the look of the user interface (step 1430).

The computer closes the application development workspace in response to receiving an input to close the application development workspace from the user (step 1432). Thereafter, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Thus, illustrative embodiments of the present invention provide a computer-implemented method, computer system, and computer program product for automatically applying a predetermined number of column guides to an application development workspace canvas to provide guidance to users while building user interface components of an application under development and rendering data of connected data sources in corresponding user interface components during design time of the application enabling users to see which data source is connected to each respective user interface component in real time. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for building a user interface of an application under development, the computer-implemented method comprising:
    connecting, by a computer, a data field to each label user interface component within a respective column user interface component;
    displaying, by the computer, a name of the data field connected to a respective label user interface component in a canvas area of an application development workspace;
    rendering, by the computer, data of the data field connected to each respective label user interface component in the canvas area of the application development workspace enabling a user to preview a look of the user interface of the application under development during application design time before implementation; and
    building, by the computer, the user interface of the application under development in response to receiving an input from the user to build the user interface after previewing the look of the user interface.

2. The computer-implemented method of claim 1 further comprising:
    automatically applying, by the computer, a predetermined number of column guides across a top of an entire width of the canvas area of the application development workspace.

3. The computer-implemented method of claim 2, wherein the predetermined number of column guides is 12, and wherein the predetermined number of column guides is contextually-aware and auto-adjusted based on a particular user interface component selected by the user in the application development workspace.

4. The computer-implemented method of claim 2 further comprising:
    adding, by the computer, a section user interface component on the entire width of the canvas area of the application development workspace; and
    adjusting, by the computer, margins and paddings of the section user interface component.

5. The computer-implemented method of claim 4 further comprising:
    adding, by the computer, a row user interface component to the section user interface component on the canvas area of the application development workspace;
    automatically adding, by the computer, a column user interface component to the row user interface component based on a default setting; and
    automatically adjusting, by the computer, an overall length of the predetermined number of column guides based on a width of the row user interface component, wherein the width of the row user interface component is less than the entire width of the canvas area and section user interface component.

6. The computer-implemented method of claim 5 further comprising:
    adding, by the computer, a set of additional column user interface components to the row user interface component; and
    automatically adjusting, by the computer, a size of each column user interface component added to the row user interface component in accordance with the automatically adjusted overall length of the predetermined number of column guides to complete a layout of the user interface of the application under development.

7. The computer-implemented method of claim 6 further comprising:

adding, by the computer, a label user interface component within each column user interface component added to the row user interface component to display text inside each column user interface component; and changing, by the computer, attributes of the label user interface component within each respective column user interface component in order for the user to visualize a style applied to each respective label user interface component in the canvas area of the application development workspace.

8. A computer system for building a user interface of an application under development, the computer system comprising:

a bus system;

a storage device connected to the bus system, wherein the storage device stores program instructions; and a processor connected to the bus system, wherein the processor executes the program instructions to:

connect a data field to each label user interface component within a respective column user interface component;

display a name of the data field connected to a respective label user interface component in a canvas area of an application development workspace;

render data of the data field connected to each respective label user interface component in the canvas area of the application development workspace enabling a user to preview a look of the user interface of the application under development during application design time before implementation; and build the user interface of the application under development in response to receiving an input from the user to build the user interface after previewing the look of the user interface.

9. The computer system of claim 8, wherein the processor further executes the program instructions to:

automatically apply a predetermined number of column guides across a top of an entire width of the canvas area of the application development workspace.

10. The computer system of claim 9, wherein the processor further executes the program instructions to:

add a section user interface component on the entire width of the canvas area of the application development workspace; and adjust margins and paddings of the section user interface component.

11. The computer system of claim 10, wherein the processor further executes the program instructions to:

add a row user interface component to the section user interface component on the canvas area of the application development workspace;

automatically add a column user interface component to the row user interface component based on a default setting; and automatically adjust an overall length of the predetermined number of column guides based on a width of the row user interface component, wherein the width of the row user interface component is less than the entire width of the canvas area and section user interface component.

12. The computer system of claim 11, wherein the processor further executes the program instructions to:

add a set of additional column user interface components to the row user interface component; and automatically adjust a size of each column user interface component added to the row user interface component in accordance with the automatically adjusted overall length of the predetermined number of column guides to complete a layout of the user interface of the application under development.

13. The computer system of claim 12, wherein the processor further executes the program instructions to:

add a label user interface component within each column user interface component added to the row user interface component to display text inside each column user interface component; and change attributes of the label user interface component within each respective column user interface component in order for the user to visualize a style applied to each respective label user interface component in the canvas area of the application development workspace.

14. A computer program product for building a user interface of an application under development, the computer program product comprising a computer readable storage medium having program instructions embodied therewith, the program instructions executable by a computer to cause the computer to perform a method of:

connecting, by the computer, a data field to each label user interface component within a respective column user interface component;

displaying, by the computer, a name of the data field connected to a respective label user interface component in a canvas area of an application development workspace;

rendering, by the computer, data of the data field connected to each respective label user interface component in the canvas area of the application development workspace enabling a user to preview a look of the user interface of the application under development during application design time before implementation; and building, by the computer, the user interface of the application under development in response to receiving an input from the user to build the user interface after previewing the look of the user interface.

15. The computer program product of claim 14 further comprising:

automatically applying, by the computer, a predetermined number of column guides across a top of an entire width of the canvas area of the application development workspace.

16. The computer program product of claim 15, wherein the predetermined number of column guides is 12, and wherein the predetermined number of column guides is contextually-aware and auto-adjusted based on a particular user interface component selected by the user in the application development workspace.

17. The computer program product of claim 15 further comprising:

adding, by the computer, a section user interface component on the entire width of the canvas area of the application development workspace; and adjusting, by the computer, margins and paddings of the section user interface component.

18. The computer program product of claim 17 further comprising:

adding, by the computer, a row user interface component to the section user interface component on the canvas area of the application development workspace;

automatically adding, by the computer, a column user interface component to the row user interface component based on a default setting; and automatically adjusting, by the computer, an overall length of the predetermined number of column guides based on a width of the row user interface component, wherein the width of the row user interface component is less than the entire width of the canvas area and section user interface component.

19. The computer program product of claim 18 further comprising:

adding, by the computer, a set of additional column user interface components to the row user interface component; and automatically adjusting, by the computer, a size of each column user interface component added to the row user interface component in accordance with the automatically adjusted overall length of the predetermined number of column guides to complete a layout of the user interface of the application under development.

20. The computer program product of claim 19 further comprising:

adding, by the computer, a label user interface component within each column user interface component added to the row user interface component to display text inside each column user interface component; and changing, by the computer, attributes of the label user interface component within each respective column user interface component in order for the user to visualize a style applied to each respective label user interface component in the canvas area of the application development workspace.

* * * * *